United States Patent Office.

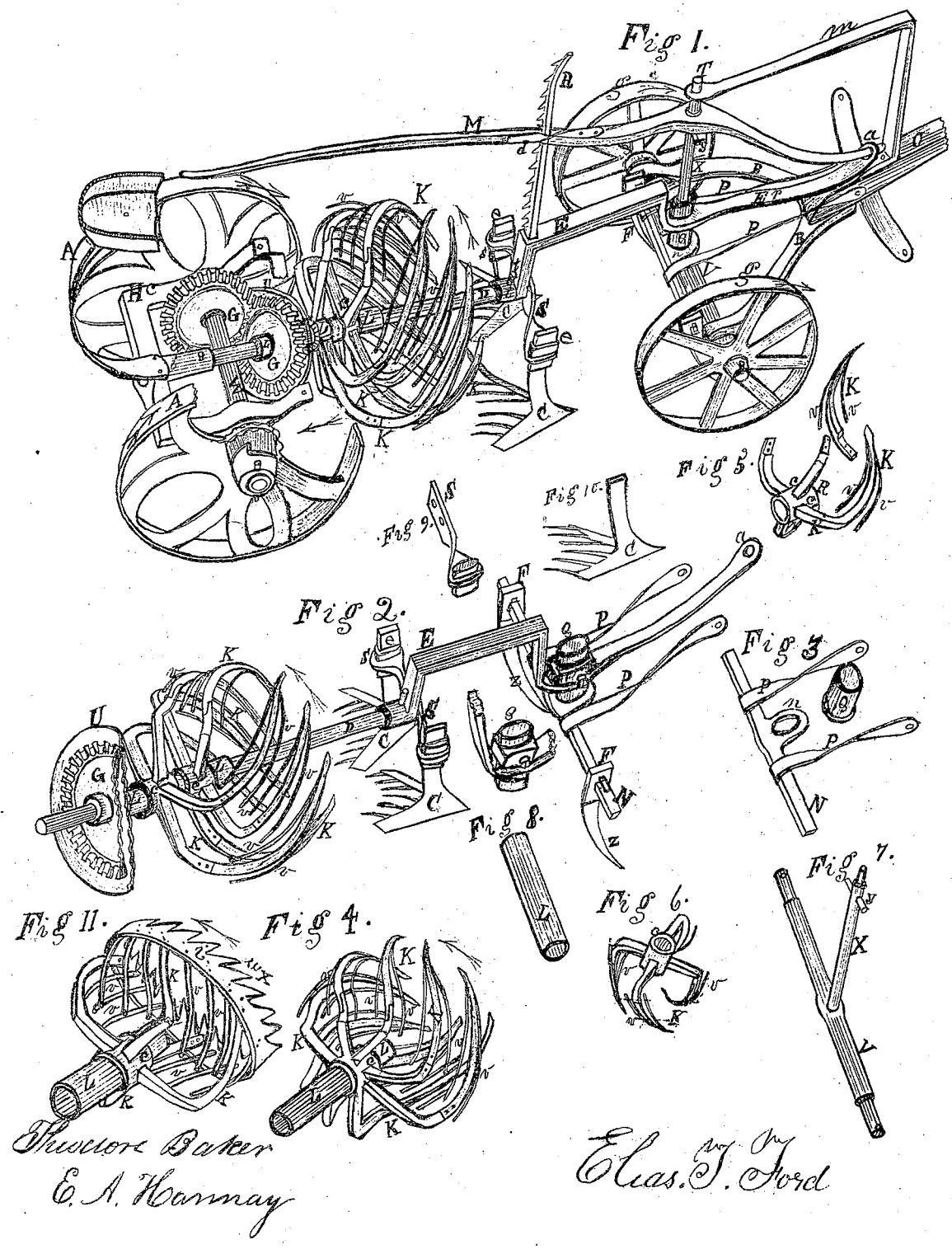

ELIAS T. FORD, OF STILLWATER, NEW YORK.

Letters Patent No. 92,437, dated July 13, 1869.

---

IMPROVEMENT IN POTATO-DIGGERS.

---

The Schedule referred to in these Letters Patent and making part of the same.

---

*To all whom it may concern:*

Be it known that I, ELIAS T. FORD, of the town of Stillwater, county of Saratoga, and State of New York, have invented new and useful Improvements in a Potato-Digging Machine, constructed of different parts, and so arranged for the purpose in calculation as to be easily managed, by a lever operating the spiral-tined cylinder through the broken potato-hill, taking out and separating the potatoes from the earth, without elevating but a small portion of the dirt. The tines are lengthened out as they radiate from the hub C, and twisted spirally, in proportion to their rotating velocity and entrance, which is designated by the drive-gear G G. And I do hereby declare that the following is an exact and full description thereof, reference being had to the accompanying drawings, marked thereon, making a part of this specification, like letters referring to like parts in the drawings.

Figure 1 is a side view, in perspective, of the machine.

Figures 2, 3, 4, 5, 6, 7, 8, 9, 10, and 11, are detached sections, as constructed and arranged in fig. 1.

The nature of my invention consists in the construction of the spiral-tined separator and digger, forming an open rotating cylinder.

The main tines are curved from the entering points of each, extending back continuous to the hub C, and separate from each other, each main tine having two branch tines $v$ $v$, connected to the main tines $k$ $k$, but not continued to the hub C, thereby providing large openings for the free discharge of potatoes and vines at the rear of the spiral-tined cylinder C K; the cylinder having two functions, both digging and separating in its rotary motion, taking up the potatoes with a small quantity of earth, sifting it from and discharging the potatoes at the rear, upon the top of the ground, caused by the peculiar curve or twist, and circular motion of the tines $k$ with branch tines $v$ $v$.

Also, the arrangement of the vine-cutters $z$ $z$, auxiliary plows ahead of the cylinder removing a greater portion of the vines, together with a portion of earth at the sides, cutting the hill loose, and guarding the entrance and delivery of the separating-cylinder.

Furthermore, the great facility and advantage possessed in elevating and depressing the control draught-bar E and shafts D, with all of their attachments, by means of the lever M and fulcrum X, the whole operated and moving upon the four-wheeled truck, as the base of control by the operator.

The advantage also of arranging the front extremities of the tines or arms $k$ $k$ with the circular plate $i$, armed with teeth or shears, used for different soils.

To enable others skilled in the art to make and use my invention, I will proceed to describe its construction and operation.

Construction of fig. 1, by reference to fig. 2, and other detached sections.

The separating-cylinder, (as seen in fig. 2,) arranged upon the centre-shaft D, composed of two sections, one of which is seen in fig. 4, with the tube L inserted, consisting of eight main tines, radiating from the hub C, in a cylindrically-spiral form, with their branch tines $v$ $v$ flaring out a little at their entering points, affording a certain pitch to each main tine $k$.

Fig. 6 illustrates the east hub C, with four main tines, with their branches $v$ $v$.

I do not confine myself to a definite number of spiral tines, with their branches. The number used depends upon the size of the separating-cylinder thus constructed.

The main tines $k$ may be separate, as a whole, and attached to the hub C, composed of wrought-iron or steel, or the branch tines $v$ $v$ of steel, or the main tines $k$ may be constructed in part of cast-iron, with the hub C, as seen in fig. 5, and the front portion composed of wrought-iron or steel, with their branches, and then be connected to the cast arms, by means of rivets or bolts.

The branch tines, to each main tine, are welded thereto, near the front extremities of each main tine, consisting of more or less, (as seen in figs. 4 and 2.)

A cylinder may be constructed as seen in fig. 11. A front hoop, of steel or iron, with teeth or shears cut upon it, similar to a saw. Their angles, inclined to the left, are arranged and connected to three or four main tines or arms, the same as those seen in fig. 4 and fig. 5, with the exception that the branch bars $v$ $v$ are attached to the front hoop $i$, or circular plate, extending to the rear with the same spiral twist as that of the main tines $k$, using one section.

The tube L, (seen in fig. 8,) is inserted through the hub C, with its parts composing one section, C K, as represented in fig. 4. I now locate another section C K upon the tube L, also arranging the two so that the main tines of each come or stand between each other, armed with their branches $v$ $v$. The two sections C K C K are made fast to the tube or sleeve L. The sleeve L may have end-boxes, which constitute bearings upon the shaft D. The tube L, with its sections, is inserted upon the centre-shaft D, as seen in fig. 2. The guard-plate U is next placed upon and near the rear extremity of the tube L. Next in order, I place the centre bevel-gear G, fig. 2. Further, shows the connection of the front extremity of the shaft D to the rear portion of section E, which is secured firmly, by means of a pin or key.

The end of the shaft D and its recess, made within the rear extremity of centre section E may be formed square, and the tube O, (seen in fig. 3,) may be formed oval, thereby preventing the two plows $c$ $c$ from canting either way when laboring within the ground.

The plows $c$ $c$, with their sections $s$ $s$, are attached to the rear extremity of the bent centre-bar E.

One section or arms may be seen in fig. 9, with an oval tube or socket, used for the reception of the plow-standards, affording greater firmness to the plows.

The arms s s are adjustable right and left upon centre-section E, and the plow-standards are adjusted to the arms s s, by changes made with the bolts, pins, or their equivalents.

The oval tube Q, (seen in fig. 3,) is arranged with and adjusted to the centre-bar E, (as seen also in fig. 2,) coupling also the bar N with bars P P, forming a yoke; but the short oval tube Q is inserted within the orifice n of shaft N, (as seen in fig. 3,) before the tube Q is located within the centre-bar or section E.

The short tube Q may be made adjustable to section E by means of set-screws, one located upon each side.

The right and left sections F F, with their blades Z Z, are placed upon the shaft N, and are adjusted horizontally upon, and retained thereto by means of keys or set-screws.

The front axle V, with its upright fulcrum-standard X, as seen in fig. 7, is now arranged with the front wheels g g, pole-section B, brace M, bar N, with its attachments, as seen in fig. 1. The two arms B forming the pole-section, each embrace the front axle V; the bars P P of yoke N extend forward and are hinged to the pole O; the brace-bar m is attached to the pole O, and so bent, extending upward and to the rear in line and over the lever M.

The fulcrum-standard X passes up through the tube Q of section E, also through the lever M and brace-bar m, and is retained firmly in position.

The bolt y is inserted underneath the lever M, holding it in position, and acts as the fulcrum upon standard X. The standard X becomes the draught-bar for all the rear attachments.

The shaft D and bar or section E, with their parts connected, are located in line with the front and rear drive-wheels A A g g.

The rear portion of shaft D is placed above the drive-axle w, entering the sleeve t, formed with the frame or yoke H C, and made fast thereto by set-screws, or their equivalent. The arms of yoke H C project forward, embracing the main axle W near each wheel A A', from thence extending upward, providing a position for the seat and cross-bar used for the same.

One of the bevel-gears, G, is placed at the left and upon the main axle W, and connected to the pinion G upon tube L. The pitch of the cogs verges or is turned aside from the centre of each gear G G, for the purpose of arranging the centre-shaft D at right angles and over the axle-shaft w, as seen in fig. 1, or its may be arranged to run at its centre lines.

The ratchet-standard R is erected upon the bar or section E, extending upward to and embracing the lever M, by means of the spring d, attached to lever M at the side.

The lever M extends forward to and enters the orifice provided within the front extremity of section E.

Operation.

As the machine is moved forward, a portion of the vines lying right and left from the hill, are gathered and cut by the vine-cutters z z, the front wheels g g holding one end when cut, for the reason that the cutters z z are moving, and the opposite ends are held in the hill stationary, and as more fully and perfectly described in a former patent. Also, as the four wheels are caused to move in the direction, as indicated by the arrows, the rear axle, with the drive-gear G, being connected to the centre pinion G, turns or rotates the tube L, with tine-sections C K, C K, (which I term the spiral separator,) to the left, as indicated by an arrow, continually entering the broken earth' and elevating the potatoes, with a small quantity of earth clinging thereto, and by the circular movement and peculiar inclination of the tines, the remaining earth is sifted through the tines, while the potatoes are retained momentarily with the vines, and discharged through the openings in rear.

The plows C C, in front of the cylinder, cut nearly all the hill at the sides and centre. The inner blades cut a little below the lines indicated by the entering points of the cylinder, at the same time protecting the front circumference of the cylinder C K from stone, vines, and grass.

The outside mould-boards remove a portion of the earth upon each side of the hill containing no potatoes, together with the cut vines. The operation of the cylinder, as seen in fig. 11, is nearly the same as that seen in fig. 4. The front cutting-surface is driven underneath the ground or hill, which is forced back upon the separators, producing the same result.

The weight and draught of the plows C C and cylinder C K rest upon the front axle, and are elevated or depressed by means of the lever M, moving the lever to the left, thereby dislocating it from the ratchet-standard R, then pressing downward, the lever resting upon the fulcrum-standard X and pinion Y, elevates the section E, with all of its attachments, and is held in this position by the standard R and spring d, and by dislocating the lever from the standard, the parts are depressed by their own gravity, at the convenience of the operator.

A pitch is given to the cylinder-tines in front, in order to give them a free and easy entrance through the ground or hill; the rotating movement is to be a trifle faster than the drive-wheels A A. The section E is elevated for the purpose of allowing the front wheels g g to pass underneath, in the act of cramping and turning around, and not interfering with any other part.

What I claim, is—

1. The digging and separating-cylinder of tines K, formed by a continuation or lengthening of the arms or tines K K, as they radiate from the hub C in a cylindrically-spiral form or shape, with the branches v v and tube or sleeve L, as described.

2. Also, the separating-cylinder of bars, formed by a continuation or lengthening of the same, as they radiate from the hub C, and surrounding their front extremities with the cutting circular plate i i, armed with teeth or shears, and its intermediate bars v v, extending to the rear in a cylindrically-spiral inclination or form.

3. Also, the central draught-bar E, with oval tube Q, shaft D, rear tube t, with frame or yoke H C, ratchet-standard R, with spring d, lever M, with fulcrum-standard X and brace-bar m.

4. Also, the combination of the four-wheel truck, as the base of adjustment and operation of the several parts, by the use of the lever M, together with the draught-bar E, shaft D, tube t, with yoke H C, yoke or bar N, arms P P, sections F F, knives z z, with plane or sickle-edges; the auxiliary plows C C, with double edges and yoke or arms s s, as described, and for the purpose specified.

ELIAS T. FORD.

Witnesses:
T. BAKER,
E. A. HANNAY.